United States Patent [19]
Wang

[11] Patent Number: 5,260,972
[45] Date of Patent: Nov. 9, 1993

[54] TECHNIQUE FOR DETERMINING SIGNAL DISPERSION CHARACTERISTICS IN COMMUNICATIONS SYSTEMS

[75] Inventor: Jin-Der Wang, Ocean, N.J.

[73] Assignee: AT&T Bell Laboratories, Murray Hill, N.J.

[21] Appl. No.: 728,824

[22] Filed: Jul. 9, 1991

Related U.S. Application Data

[63] Continuation-in-part of Ser. No. 493,017, Mar. 13, 1990, abandoned.

[51] Int. Cl.$^5$ .............................................. H04N 7/08
[52] U.S. Cl. ...................................... 375/58; 375/13; 375/99; 375/96; 358/187
[58] Field of Search ........................ 375/13, 15, 39, 96, 375/99, 58; 358/21 V, 139, 167, 187, 905

[56] References Cited

U.S. PATENT DOCUMENTS

| | | | |
|---|---|---|---|
| 4,359,760 | 11/1982 | Holmes | 358/167 |
| 4,371,266 | 2/1983 | Holmes | 358/905 |
| 4,374,400 | 2/1983 | Holmes | 358/905 |
| 4,413,282 | 11/1983 | Wargo | 358/167 |
| 4,651,212 | 3/1987 | Lewis, Jr. | 358/905 |
| 4,698,680 | 10/1987 | Lewis, Jr. et al. | 358/905 |
| 4,864,403 | 9/1989 | Chao et al. | 358/905 |
| 4,896,213 | 1/1990 | Kobe et al. | 358/167 |
| 4,980,767 | 12/1990 | Chao et al. | 375/13 |

FOREIGN PATENT DOCUMENTS 212839 3/1987 European Pat. Off. .

OTHER PUBLICATIONS

Chao, Ty-Hong S., "Multi-Path Equalization for NTSC Video by Using Digital IIR Filter," *IEEE Transactions on Consumer Electronics*, vol. 34, No. 1, Feb. 1988, pp. 268-278.

Advanced Television Systems Committee (ATSC) Standards proposal by the Japanese Broadcasting Technology Association presented during ATSC Standards Committee Meeting, Sep. 18, 1989, "Ghost Cancelling System."

H. Miyazawa, "Development of a Ghost Cancel Reference Signal for TV Broadcasting," *IEEE Transactions on Broadcasting*, vol. 35, No. 4, Dec. 1989, New York, U.S.A., pp. 339-347.

*Primary Examiner*—Stephen Chin
*Attorney, Agent, or Firm*—David R. Padnes

[57] ABSTRACT

The present invention covers the notion of determining signal dispersion characteristics, such as amplitude, phase and delay, by transmitting a training sequence. This training sequence includes a plurality of predetermined symbols and has a time duration at least equal to the expected range of the signal dispersion delay characteristic. At a receiver, the received training sequence is processed using correlation and signal replication and the aforesaid signal dispersion characteristics are determined therefrom.

24 Claims, 14 Drawing Sheets

400

600

800

900

1200

TECHNIQUE FOR DETERMINING SIGNAL DISPERSION CHARACTERISTICS IN COMMUNICATIONS SYSTEMS

This application is a continuation-in-part of application Ser. No. 493,017, filed on Mar. 13, 1990 now abandoned.

TECHNICAL FIELD

The present invention relates to a technique for determining the characteristics of signal dispersion and, more particularly, to a technique in which a training sequence is transmitted and processed at a receiver so as to create a time interval in which the characteristics of the signal dispersion can be accurately quantified.

BACKGROUND OF THE INVENTION

A training sequence is a series of apriori known symbols which are transmitted at predetermined times from a signal transmitter to a signal receiver. Such sequences have long been used to adjust the operation of signal dispersion compensation apparatus in the receiver, such as equalizers, echo cancellers and the like.

Signal dispersion, such as echoes or signal "ghosts", is an inherent problem in communications systems and the severity of the problem can vary with the system application. For example, signal ghosts or echoes frequently exist in conventional television transmission systems which are highly objectional to the viewer and which can render a high definition television (HDTV) signal unintelligible. Accordingly, compensation for signal dispersion is highly desirable in conventional television systems and, indeed, is required in HDTV and in many other communications applications. Moreover, while signal dispersion compensation apparatus, such as equalizers and cancellers, provides satisfactory compensation, knowledge of the signal dispersion characteristics, e.g., amplitude, delay and phase, is useful for the adjustment of such apparatus during system start-up and operation.

Prior art techniques exist which can determine the characteristics of signal dispersion. Such techniques typically transmit specific signals, such as pulses or training sequences, which are detected and analyzed in the receiver. These techniques provide satisfactory estimates of the signal dispersion characteristics in applications wherein the dispersion is large in amplitude and short in duration. However, the prior art techniques provide inaccurate results when the signal dispersion is small in amplitude, particularly in the presence of channel noise, jitter or similar impairments, and provide ambiguous results when the signal dispersion is long in duration. These shortcomings have hindered development of communications systems requiring ever-more precise signal dispersion compensation and more precise determination of the signal dispersion characteristics.

Most recently, as disclosed in a pending application to Chao et al., Ser. No. 443,772, filed Nov. 30, 1989, and assigned to the present assignee, a technique which overcomes the aforesaid problems of the prior art has been developed which transmits two different training sequences wherein each such training sequence includes a different number of symbols. This technique, while providing greater accuracy than those of the previous prior art, requires a time duration for the transmission of the two different training sequences which is not always available. Therefore, a technique which provides greater accuracy in the determination of small-amplitude and long-duration signal dispersion and which requires less time duration would be desirable.

SUMMARY OF THE INVENTION

The present invention covers the notion of determining the amplitude, phase and delay of signal dispersion by transmitting a training sequence including a plurality of apriori known symbols and having a time duration at least equal to the expected range of signal dispersion delay. At a receiver, the training sequence is recovered and then processed using correlation and signal replication techniques. This processed training sequence is then utilized to determine at least one of the aforesaid signal dispersion characteristics.

A feature of the present invention is that it is applicable to a variety of different communications systems and is particularly adaptable for television signal transmission wherein the training sequence can be advantageously transmitted during the vertical blanking interval. Another feature of the present invention is that it significantly improves the accuracy of determining the characteristics of signal dispersion when such dispersion is of long duration, has a small amplitude, or is accompanied by channel noise, jitter and similar impairments.

DETAILED DESCRIPTION

Figure 1:
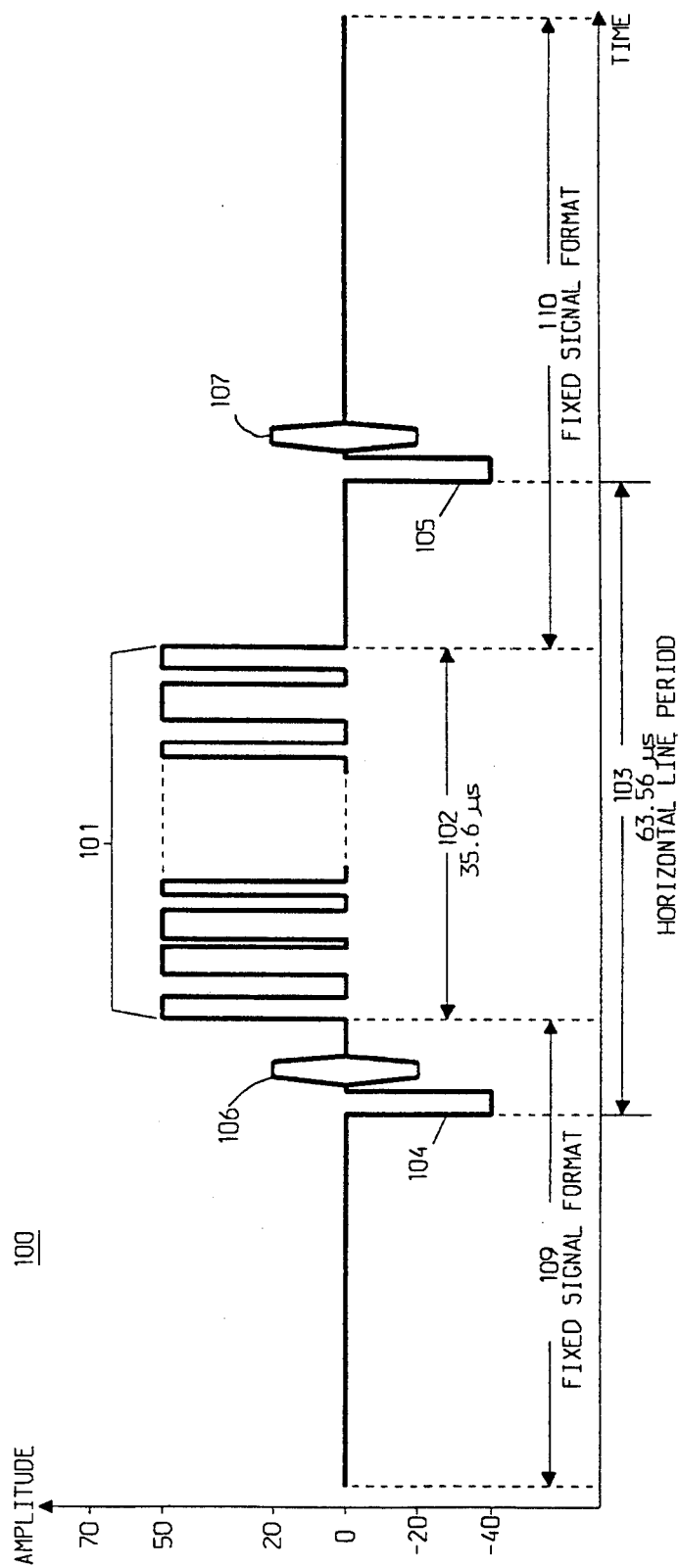
FIGS. 1 and 2 are representations of an illustrative signal format wherein a training sequence is transmitted in accordance with the present invention.

FIG. 1 shows a portion 100 of an illustrative enhanced National Television System Committee (NTSC) television signal format which incorporates a training sequence 101 during time interval 102 pursuant to the present invention. At this juncture, it will, of course, be understood that the present invention is not restricted to use in such a television signal format and can be utilized with any television signal format, e.g., Sequence Electronique Couleur Avec Memoire (SECAM), Phase Alternation Line (PAL), and HDTV, as well as signal formats for communications systems other than television transmission. In this illustrative format, sequence 101 includes 255 symbols which are transmitted at a rate of $7.160 \times 10^6$ symbols/second so that time interval 102 has a duration of $35.6 \times 10^{-6}$ seconds ($\mu$s). Preferably, sequence 101 is a pseudorandom sequence. In addition, as shown, sequence 101 is advantageously transmitted during the 63.56 $\mu$s horizontal line period 103 which extends between horizontal synchronization pulses 104 and 105. Horizontal period 103 is one of a plurality of line periods in a vertical blanking interval in a video frame. Incorporation of the training sequence in the unused time interval in horizontal line period 103 advantageously does not require any alteration of the television signals transmitted before and after sequence 101. Envelopes 106 and 107 represent the color bursts in an NTSC format which respectively follow pulses 104 and 105. Within intervals 109 and 110, the signals in the NTSC format are known and provide well-known functions unconnected with the present invention. However, as will be discussed hereinbelow, the known nature of the signals in these intervals will be advantageously utilized by the present invention to permit the accurate replication of the transmitted training sequence 101 by a store-and-subtract process. Interval 109 must be at least as long as the maximum delay of any postcursor ghosts and interval 110 must be at least as long as the sum of the maximum postcursor ghost delay and precursor ghost delay. The former delay is typically represented by a positive time value and the latter delay is typically represented by a negative time value. The sum of the maximum postcursor ghost delay and precursor ghost delay time values, ignoring any algebraic sign, is hereinafter referred to as the expected range of signal dispersion delay.

Figure 2:
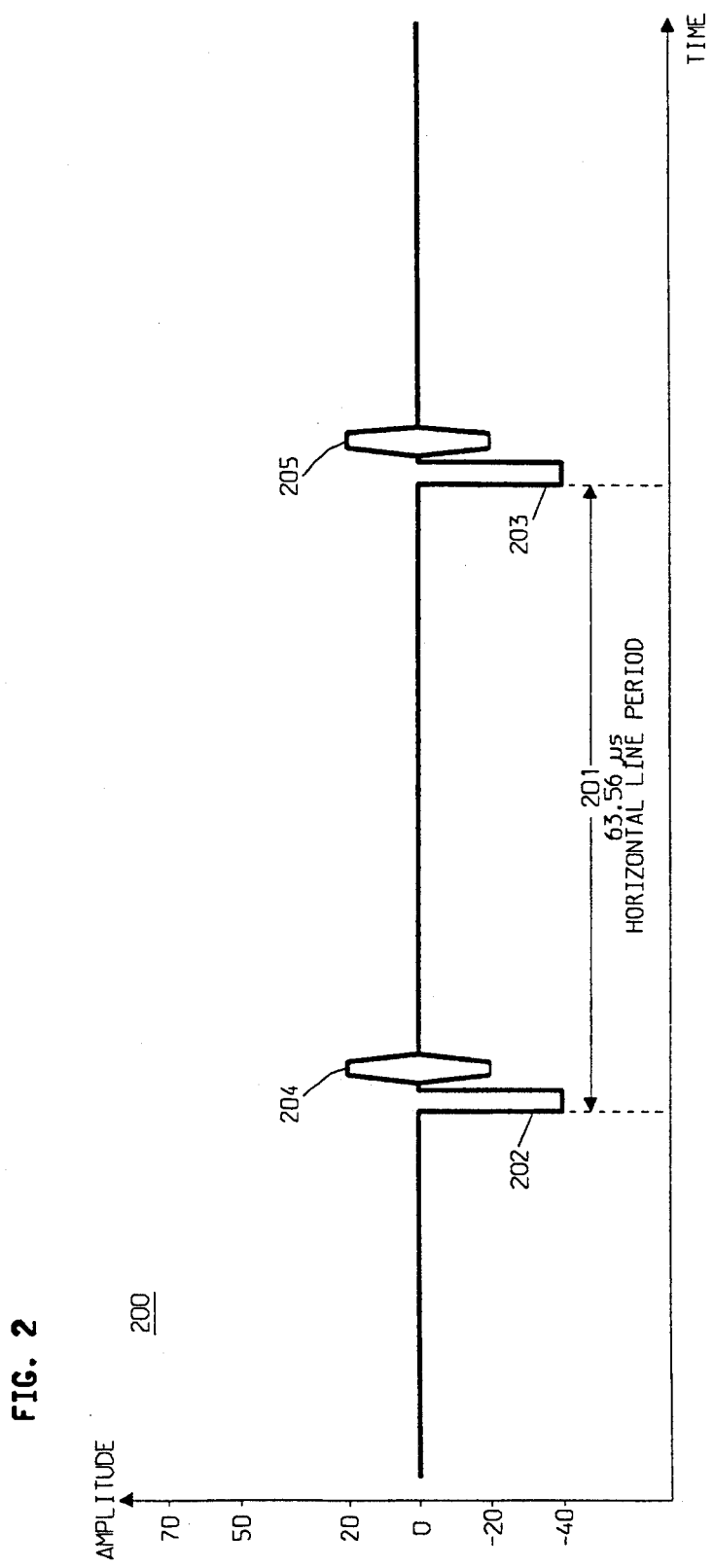

FIG. 2 shows a portion 200 of the illustrative NTSC television signal format wherein portion 200 succeeds portion 100 and includes a horizontal line period 201 within a vertical blanking interval. Horizontal line period 103 is disposed between horizontal synchronization pulses 202 and 203. Envelopes 204 and 205 represent color bursts and are identical to envelopes 106 and 107 of FIG. 1. It should be noted that portions 100 and 200 are identical except that the training sequence 101 is not transmitted during horizontal line period 201.

Figure 3:
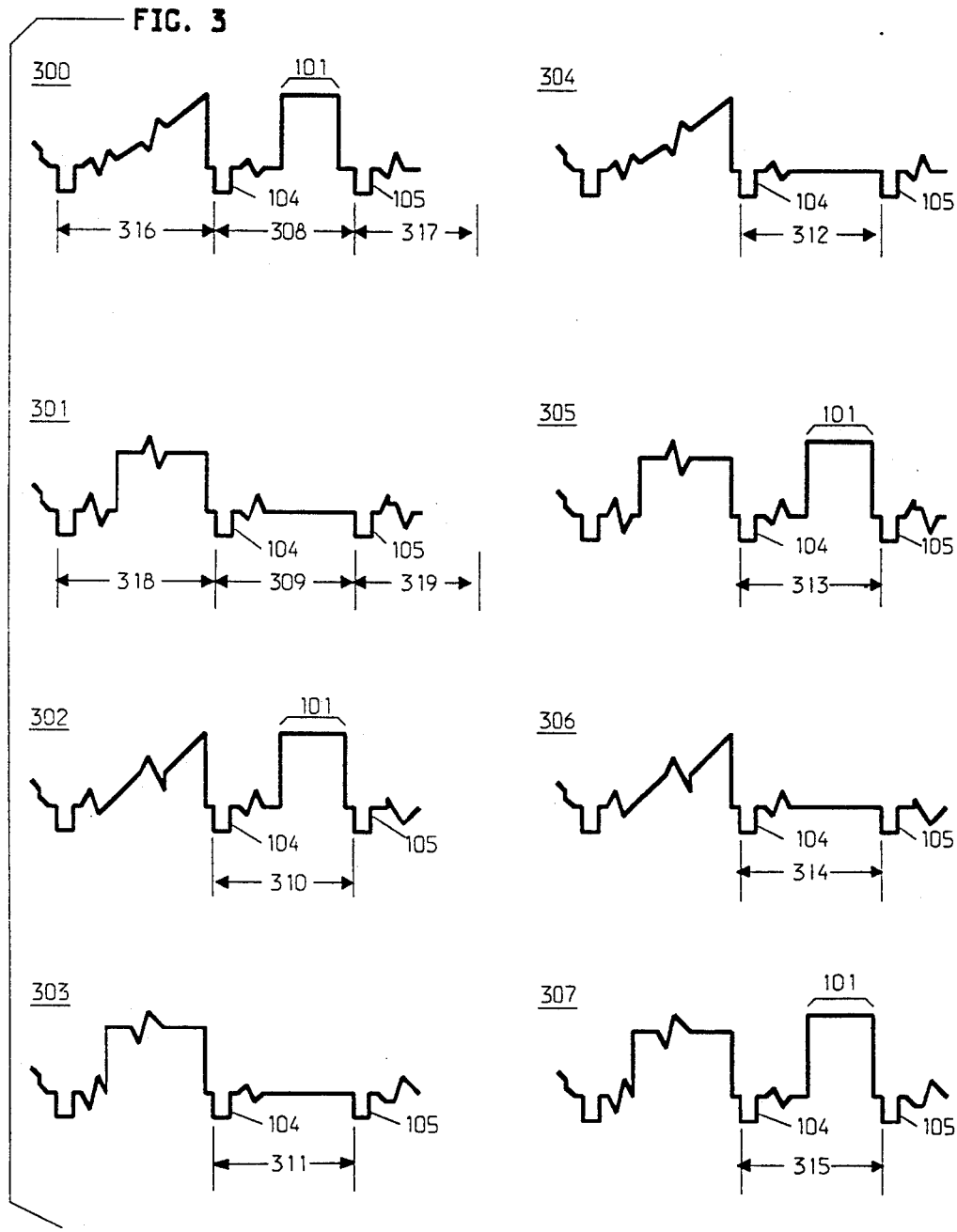
FIG. 3 is a representation of illustrative signals, including signals which precede and succeed the transmission of the training sequence of FIG. 1, utilized by the disclosed embodiment of the present invention.

FIG. 3 shows the periodic nature of the transmission of training sequence 101 within eight portions 300–307 of an NTSC television signal format. Each of portions 300 through 307 has the same time duration and respectively includes one horizontal line period 308 through 315 in eight successive vertical blanking intervals. Each such horizontal line period is disposed between a pair of horizontal synchronization pulses 104 and 105.

We shall define the term training sequence period as a time interval within one horizontal line period of each vertical blanking interval. During this training sequence period, either the training sequence 101 or a zero dc signal is transmitted. Accordingly, the designations 308 through 315 in FIG. 3 designate this training sequence period.

It should be noted that in the NTSC signal format, shown in FIG. 3, the signals surrounding any training sequence period are different from those surrounding an immediately following training sequence period. For example, the signals in intervals 316 and 317, which immediately precede and succeed training sequence period 308, are different from those in intervals 318 and 319, which immediately precede and succeed training sequence period 309. Training sequence period 309 occurs during a vertical blanking interval immediately following the vertical blanking interval that includes training sequence period 308. However, the signals surrounding any given training sequence period are identical to those surrounding the fourth next training sequence period after the given training sequence period. In this regard, note that portions 300 and 304 are identical but for the training sequence 101. This identity also exists between portions 301 and 305, portions 302 and 306, and between portions 303 and 307. Accordingly, if the signals in the foregoing paired signal portions were stored and then one stored signal in each pair was subtracted from the other, an accurate replica of the transmitted training sequence could be recovered. For example, training sequence 101 could be recovered in the receiver by subtracting portion 304 from portion 300, subtracting portion 301 from portion 305, subtracting portion 306 from portion 302 and subtracting portion 303 from portion 307. It is this process of pairing the above-described signal portions, each including a training sequence period, which is used in a receiver constructed pursuant to the present invention.

Figure 4:
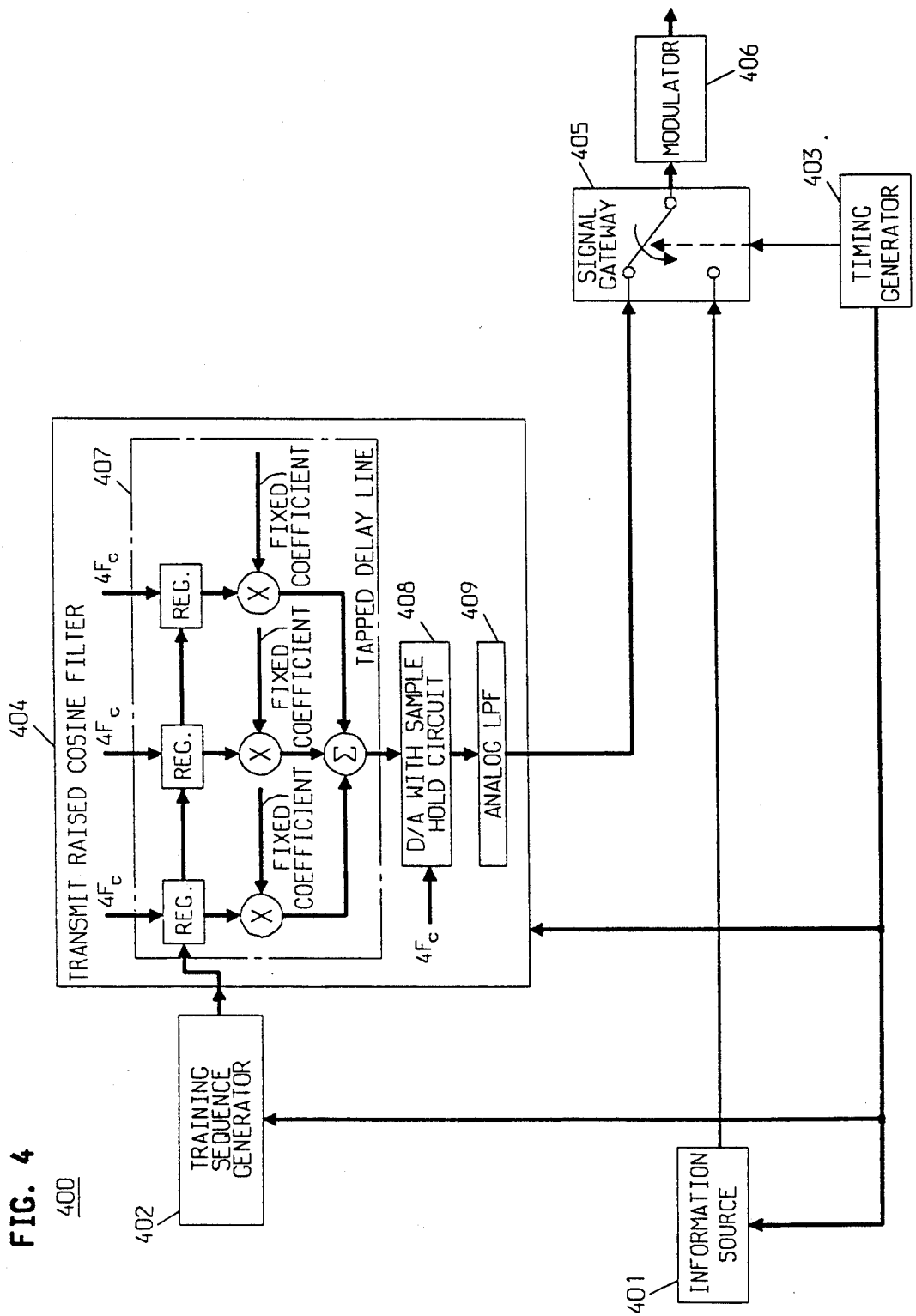
FIG. 4 is a block-schematic diagram representation of an embodiment of a transmitter which incorporates the present invention.

Refer now to FIG. 4 which shows a transmitter 400 incorporating the present invention. The transmitted information signal, which in the illustrative embodiment is a conventional NTSC formatted signal, is generated by information source 401. This signal is then coupled to signal gateway 405 under the control of timing signals from timing generator 403. Training sequence generator 402 generates training sequence 101 within horizontal line periods 308, 310, 313 and 315 under the control of timing signals from timing signal generator 403 and couples these sequences to signal gateway 405. Advantageously, each of these pseudorandom sequences is spectrally shaped by raised cosine transmit filter 404 before being coupled to signal gateway 405. Gateway 405, illustratively represented by a single-pole, multi-throw switch, selectively couples the signals from source 401 or generator 402 to modulator 406 which provides vestigial sideband (VSB) amplitude modulation in the illustrative NTSC television application, or quadrature amplitude modulation (QAM) in other communication systems.

The transmit filter 404 advantageously includes tapped delay line 407, digital-to-analog (D/A) converter with a sample hold circuit 408 and an analog low-pass filter (LPF) 409 connected in series. Tapped delay line 407 and D/A converter 408 are clocked at four times the symbol rate ($F_c$). Analog LPF 409 advantageously eliminates out-of-band signal energy.

Figure 5:
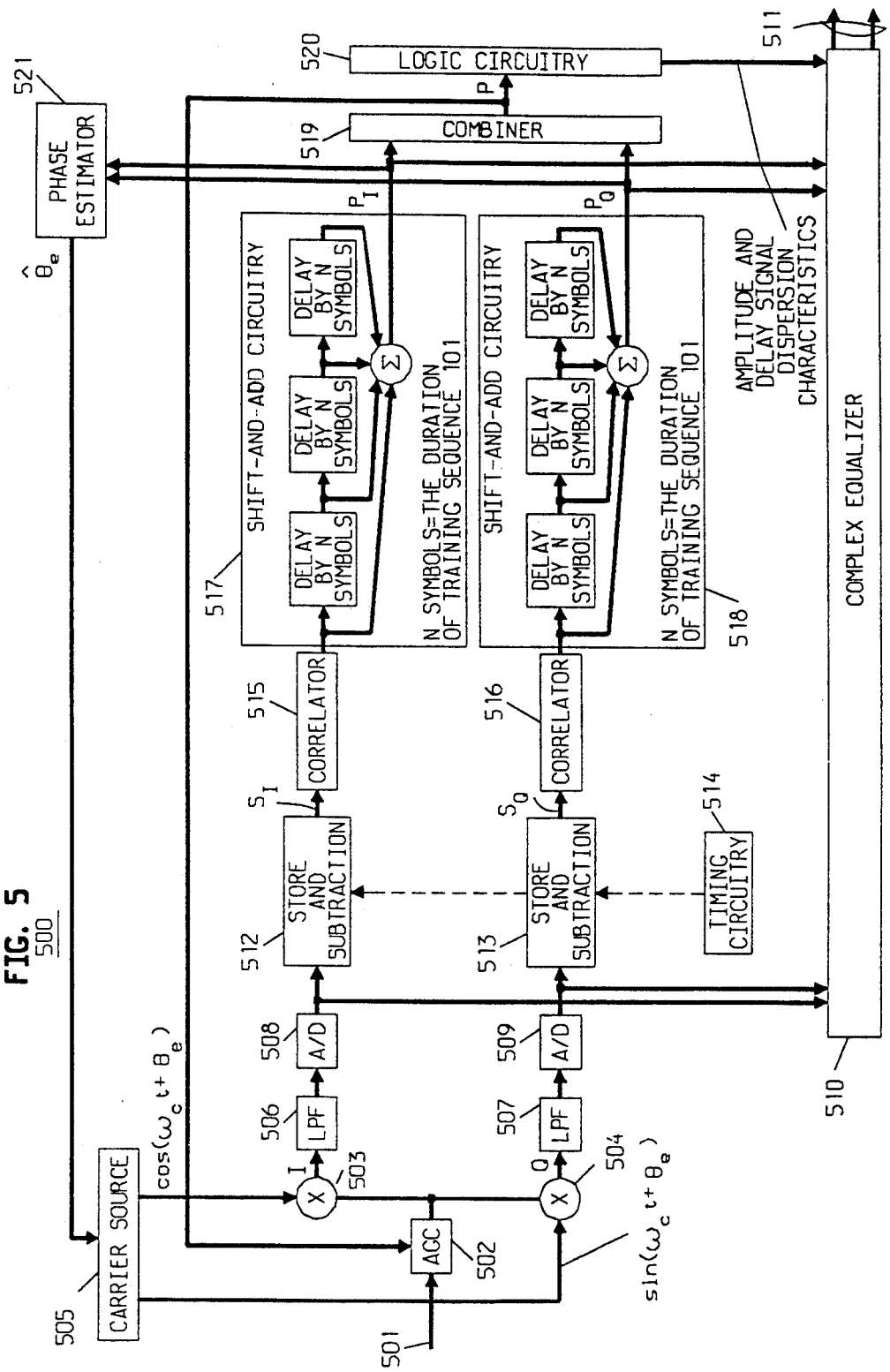
FIGS. 5 and 6 are alternate block-schematic diagram representations of embodiments of a baseband receiver which incorporates the present invention.
Figure 6:
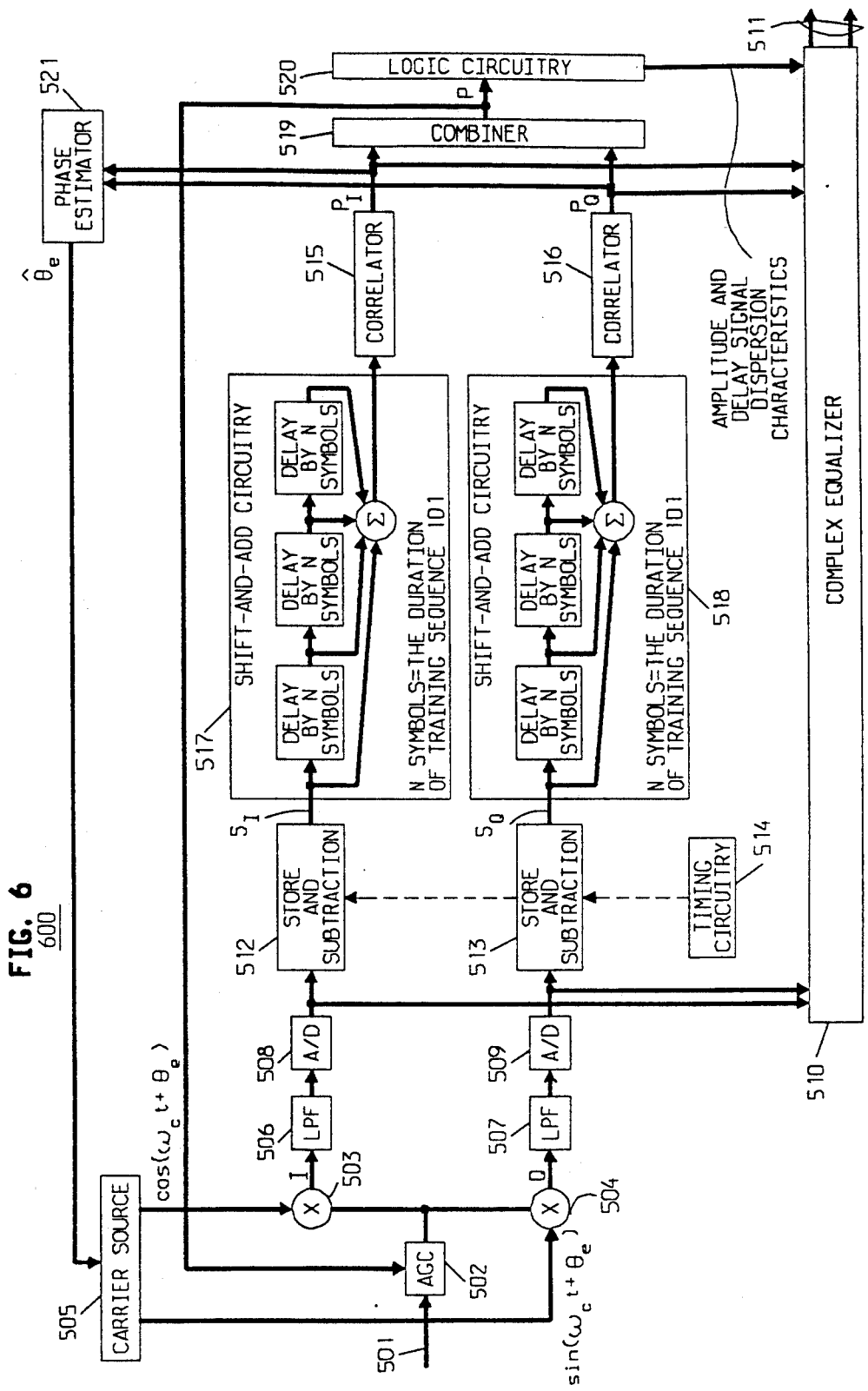

FIGS. 5 and 6 respectively show alternate embodiments of a baseband receiver 500 and 600 which incorporate the present invention. As shown in FIG. 5, the received modulated signal incorporating training sequence 101 is coupled via lead 501 through automatic gain control (AGC) circuit 502 to demodulators 503 and 504. Each demodulator multiplies the received signal by carrier signals generated by carrier source 505. One of these carrier signals is represented by cos $(\omega_{ct}+\theta_e)$ while the other is represented by sin $(\omega_{ct}+\theta_e)$, where $\omega_c$ is the carrier frequency used in the transmitter modulator of FIG. 4 and $\theta_e$ is the phase angle between the carrier signals supplied by carrier source 504 and those utilized by the transmitter modulator.

Each demodulator output is coupled through low-pass filters (LPF) 506 and 507 to analog-to-digital converters (A/D) 508 and 509. The digital outputs of these converters are supplied to a complex equalizer 510, which removes distortion in the received signal so as to accurately recover the transmitted information signal and provide a pair of output signals 511 for further conventional television processing. The term "complex", with reference to equalizer 510, refers to the fact that this equalizer utilizes coefficients which are complex numbers, i.e., they have a real and an imaginary component. The digital outputs of converters 508 and 509 are also coupled to store-and-subtraction circuits 512 and 513.

The function of store-and-subtraction circuits 512 and 513 is to recover the training sequence 101 from the received signal by storing the paired waveforms of FIG. 3, i.e., 300 and 304, 301 and 305, 302 and 306, and 303 and 307, and then subtracting one waveform in each pair from the other. To extract the incoming signal waveform at the appropriate time so as to recover each of these paired waveforms, circuits 512 and 513 are periodically enabled by timing circuitry 514. The recovered training sequences recovered by circuits 512 and 513 are respectively designated as $S_I$ and $S_Q$.

Correlators 515 and 516 are designed to produce an output pulse upon detecting the training sequence. These output pulses, along with the correlator output at other times, are replicated three times within shift-and-add circuitry 517 and 518 at a spacing equal to the length of training sequence. The correlator output pulses and their replications at the training sequence duration produces signals $P_I$ and $P_Q$. Combiner 519 receives the signals $P_I$ and $P_Q$ and produces the sum of the square of these signals. This sum is designated as P. Logic circuitry 520 determines the amplitude and delay characteristics of the signal dispersion in response to signal P.

It should be noted that the use of the shift-and-add circuitry has the effect of advantageously reproducing the correlator output pulses as if training sequence 101 were transmitted four times in succession. While this could be done, such successive transmission of the training sequence whose duration is at least equal to the range of signal dispersion delay can require a greater time duration than is available. This is particularly true in the case of a conventionally transmitted television signal, such as NTSC, PAL or SECAM wherein the intervals not used for other signal transmission are not long enough for such successive training sequence transmission.

While the amplitude and delay characteristics determined by logic circuitry 520 can be made using only a single correlator, e.g., correlator 515 and its associated single shift-and-add circuit 517, and, therefore, use of correlator 516, shift-and-add circuitry 518 and combiner 519 can be eliminated, the use of both correlators and the combiner advantageously provides a mechanism for adjusting the carrier phase produced by carrier source 505 and the automatic gain control provided by AGC circuit 502. In addition, use of both signals $P_I$ and $P_Q$ allows the estimation of ghost characteristics while carrier phase adjustment is still taking place.

Estimation of the correct carrier phase can be determined by using $P_I$ and $P_Q$ by well-known means within phase estimator 521 which approximate the arc tangent of $P_Q/P_I$. Adjustment of the carrier phase can then be readily provided by coupling the estimated carrier phase, designated as $\theta_e$, appearing at the output of the phase estimator to carrier source 505. Similarly, by using the signal P, it is well-known that the amplitude of the received signal can be estimated so as to correct the gain of the receiver. In FIG. 5, signal P is coupled to AGC circuit 502 to provide this gain adjustment.

The amplitude and delay characteristics provided by logic circuitry 520 along with signals $P_I$ and $P_Q$ are coupled to complex equalizer 510 wherein they are used to adjust the operation thereof. Specifically, in well-known fashion, the amplitude and delay characteristics are used to determine which equalizer coefficients are non-zero and signals $P_I$ and $P_Q$ are used to adjust the values of these non-zero coefficients.

The receiver embodiment shown in FIG. 6 is identical in function and operation to that already described in reference to FIG. 5 except that the serial connection of the correlators and shift-and-add circuitry is reversed. As a result, the training sequences' are replicated in FIG. 6 as opposed to replicating the correlator output in FIG. 5. This reversal is equivalent.

Figure 7:
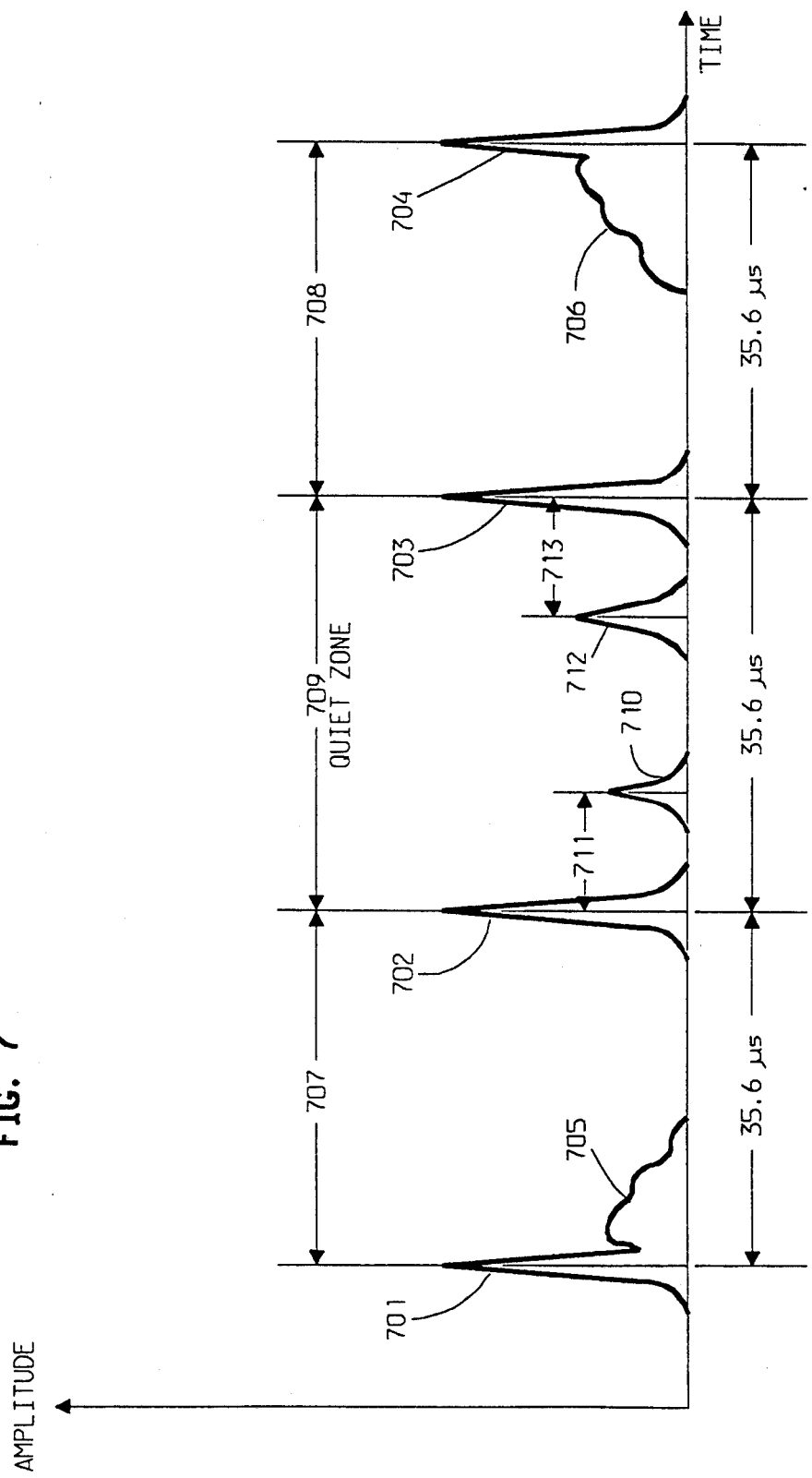
FIG. 7 is a representation of an illustrative output signal of the inphase correlator 515 of FIG. 5.

An illustrative output of the inphase shift-and-add circuitry 517 of FIG. 5, designated as $P_I$, is shown in FIG. 7. The output of the quadrature shift-and-add circuitry 518 and designated as $P_Q$ is related to $P_I$ by a function of the phase shift of the communications medium through which the received signal has propagated. As is well known, a correlator is designed to provide a large amplitude output pulse upon detecting a training sequence. At other times, the correlator output may be ambiguous and the correlator output amplitude is substantially less than when the training sequence is detected.

Signal $P_I$ includes four signal peaks 701 through 704 wherein each peak represents a training sequence or its replicas generated by shift-and-add circuitry of FIG. 5. These peaks are spaced apart by 35.6 µs time intervals. It should be noted that the intervals between peaks 701 and 702 and between peaks 703 and 704 are respectively corrupted by incompletely correlated postcursor and precursor ghosts of the training sequence. These incompletely correlated postcursor and precursor ghosts are respectively represented by waveforms 705 and 706. The presence of such incompletely correlated ghosts lessens the ability to clearly discern ghost characteristics in those portions of intervals 707 and 708 containing waveforms 705 and 706. However, either one of these intervals could be used to determine signal dispersion characteristics and, consequently, the shift-and-add circuitry in the receiver need only provide at least one replica of its input. It is however, advantageous, for such circuitry to provide three replicas of its input signal so as to provide the four illustrated peaks 701 through 704 and thereby provide buffer intervals 707 and 708 for an innermost interval 709, designated as a "quiet zone". Such buffer intervals sufficiently separate quiet zone 709 in time from incompletely correlated ghosts so that it is devoid of all ghost signals except those of the transmitted training sequence that undergo full correlation. Such ghosts can be either postcursor ghosts, i.e., they are received after the training sequence, or precursor ghosts, i.e., they arrive at the receiver prior to the transmitted training sequence. FIG. 7 depicts one such postcursor ghost as signal peak 710 which is located at a time interval 711 following peak 702 and one precursor ghost by peak 712 which is located at a time interval 713 preceding peak 703. Accordingly, the methodology used by the present invention and provided within logic circuitry 519 is to determine the amplitude of any ghost by using amplitude comparators which determine the presence of any signals in the quiet zone above a predetermined level and the magnitude of such signals. The delay of any such ghost is then determined by the location of any detected signal above this threshold relative to peaks 702 or 703. Note that there is virtually no ambiguity in discerning between postcursor and precursor ghosts as the duration of quiet zone 709 extends for at least the range extending from the maximum delayed precursor ghost, typically designated by a negative time value, to the maximum delayed postcursor ghost, which is typically designated by a positive time value.

Figure 8:
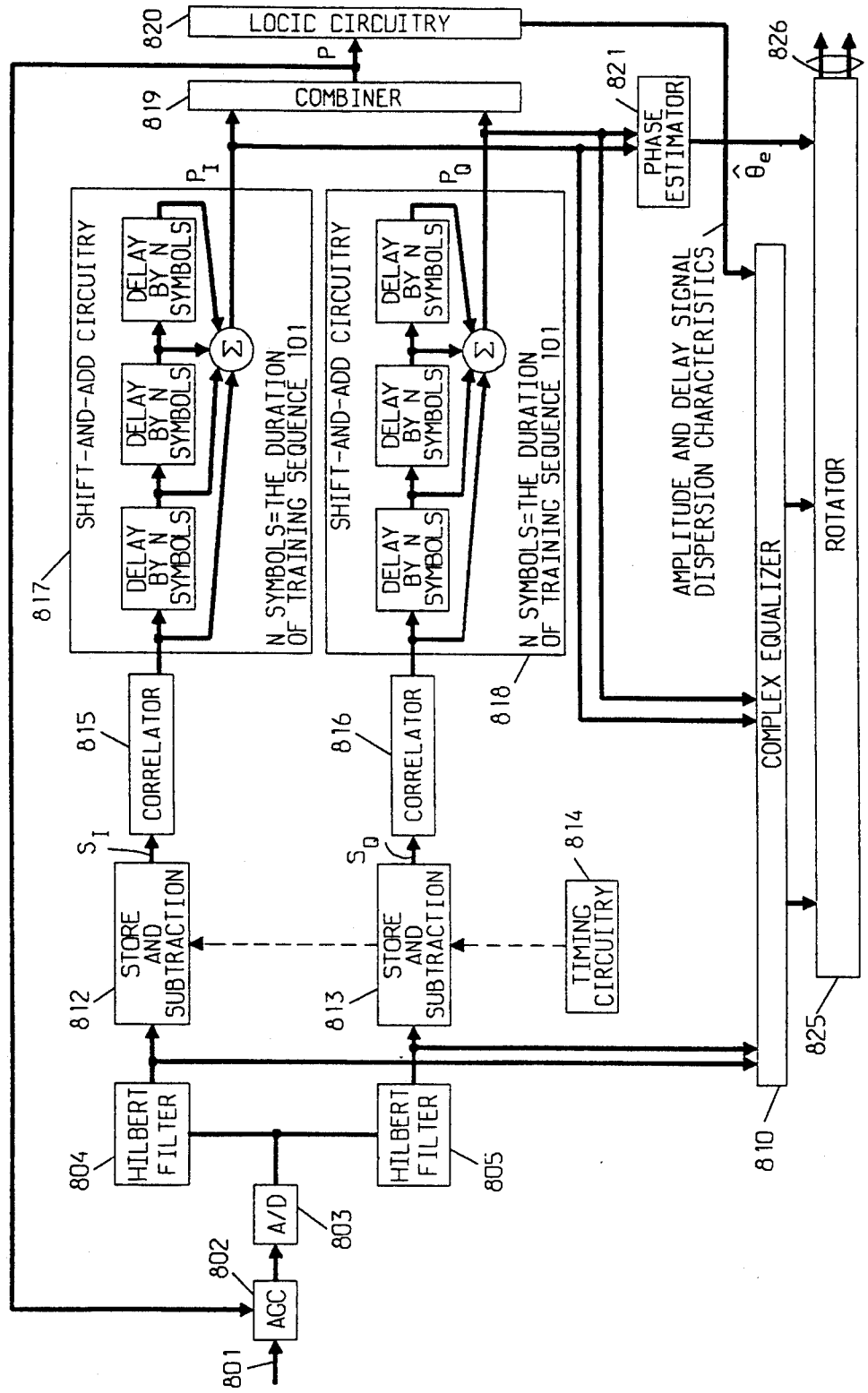
FIGS. 8 and 9 are alternate block-schematic diagram representations of embodiments of a passband receiver which incorporates the present invention.
Figure 9:
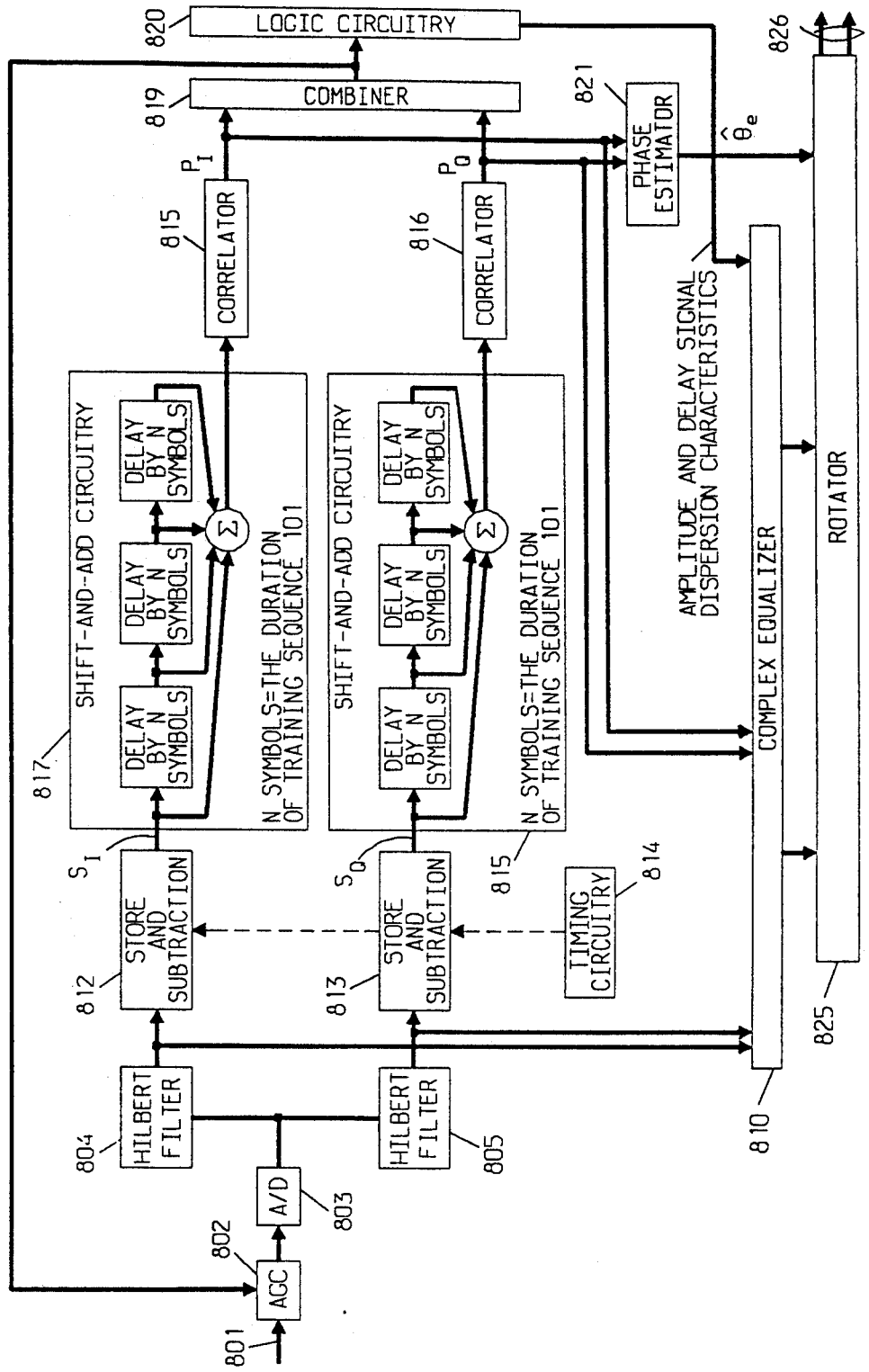

FIGS. 8 and 9 show alternate embodiments of a passband receiver which incorporates the present invention. In these receivers the received QAM signal on lead 801 is coupled through AGC circuitry 802 to A/D converter 803 and thence to passband Hilbert filter pair 804 and 805. Filters 804 and 805 provide outputs which are coupled to complex equalizer 810 and to store-and-subtraction circuits 812 and 813. The outputs of complex equalizer 810 are connected to rotator 825 to produce the transmitted information signals on outputs 826. The operation of store-and-subtraction circuitry 812 and 813, correlators 815 and 816, shift-and-add circuitry 817 and 818, combiner 819, logic circuitry 820 and phase estimator 821 are functional equivalents to their counterparts in the baseband receiver. FIG. 9 is similar in operation to FIG. 8 but for the reversal in the series connection of shift-and-add circuitry 817 and 818 and correlators 815 and 816.

In FIGS. 5, 6, 8 and 9, it is preferable that the correlator filter coefficients be binary numbers corresponding to those in the training sequence since such coefficients can have only one of two values, such as $+1$ and $-1$, and implementation is thereby simplified. However, the use of such binary coefficients in both the correlator and the transmitter training sequence generator can produce dc bias in the quiet zones. Such dc bias, which is inherent due to the autocorrelation nature of a pseudorandom sequence, can be eliminated using well-known techniques. For example, in one such technique the dc bias can be measured and then subtracted from $P_I$ and $P_Q$ or from the signal combiner output signal P. In another technique, the dc bias can be eliminated by passing $P_I$ and $P_Q$ or P through a properly chosen dc blocking filter (not shown), such as those which subtract a delayed version of the signal from the signal itself.

A modified pseudorandom sequence can be transmitted in lieu of a pseudorandom sequence. In a modified pseudorandom sequence, a dc constant is added to each symbol of a pseudorandom sequence so that the transmitted symbols are either zero or a positive value rather than the equal positive or negative values of the original pseudorandom sequence. The advantage of using a modified pseudorandom sequence is that, unlike the original pseudorandom sequence, there is no dc bias in any quiet zone at the output of a correlator. Accordingly, it is preferable to utilize both binary correlators and modified pseudorandom training sequences in the preferred embodiment of the present invention. For another arrangement, a pseudorandom sequence having $+1$ and $-1$ symbol values is transmitted and the coefficients of the binary correlator take values of either $+1$ or 0 instead of the $+1$ and $-1$ values.

Figure 10:
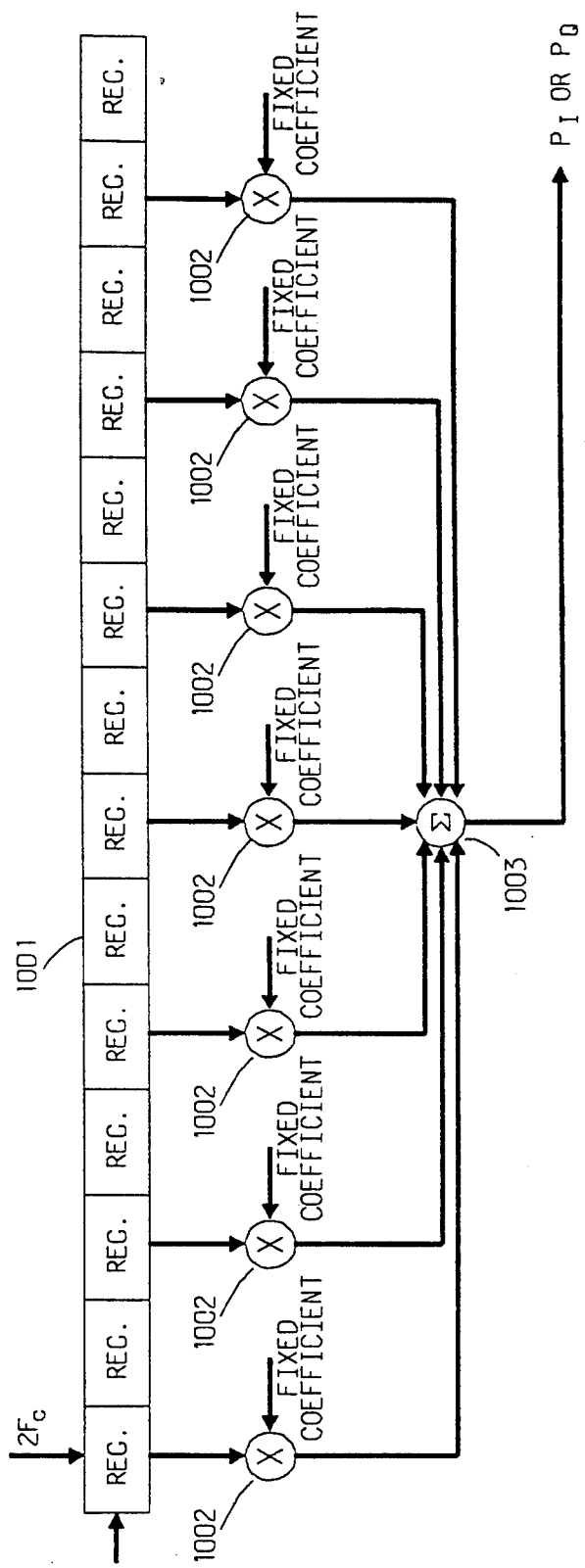
FIG. 10 is a block-schematic diagram representation of an embodiment of the correlator in FIGS. 5, 6, 8 or 9.

In FIGS. 5, 6, 8 and 9, it is advantageous for A/D converter 508, store-and-subtract 512, correlator 515, and shift-and-add circuitry 517 to operate at a rate which is a multiple, n, of the symbol rate, where n is an integer $>1$, in order to provide higher resolution of the signal dispersion delay. With such an arrangement, it is preferable to implement the correlator as shown in FIG. 10. As illustrated in FIG. 10, the correlator, e.g., 515, is implemented by utilizing a tapped delay line 1001, clocked at twice the symbol rate, $2F_c$, multipliers 1002 and summer 1003. Each multiplier utilizes a fixed correlation coefficient which multiplies the symbol value stored in one of the taps of delay line 1001. The delay line taps which are combined by summer 1003 are spaced apart by the symbol rate. The intermediate taps are not associated with a multiplier and therefore are not inputted to summer 1003. In the preferred embodiments, where a binary correlator is utilized, the correlation coefficients are either $+1$, $-1$ or $+1$, 0. With such coefficients, the multipliers 1002 can be realized by pass through elements for a $+1$ multiplication, sign inversion elements for a $-1$ multiplication, and signal blocking elements for a 0 multiplication.

Figure 11:
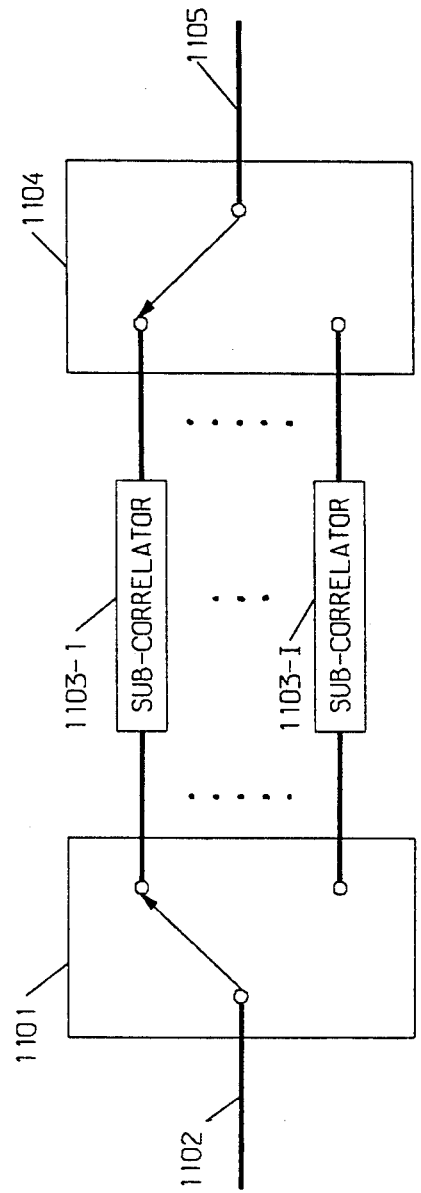
FIG. 11 is a block-schematic diagram representation of an alternate embodiment of the correlator in FIGS. 5, 6, 8 or 9.

In many applications, the sampling rate at the receiver is generally chosen to be an integer multiple, I, of the training sequence symbol rate. Therefore, each active correlator tap is separated by I-1 zero or null taps. Each active tap multiplies its associated symbol value by a non-zero value while each null tap, in effect, multiplies its associated symbol value by zero. One computationally-simple implementation of a correlator has been shown in FIG. 10. Another alternative is to use the sub-correlator structure 1100 shown in FIG. 11. Such a structure eliminates the I-1 null taps separating each active tap. In FIG. 11, a demultiplexer 1101 sequentially distributes successive received samples on lead 1102 to a different one of I sub-correlators 1103-1 through 1103-I. Each sub-correlator has an ordered sequence of tap settings which is equal to the ordered sequence of symbol values in the training sequence. The output of each sub-correlator is then sequentially multiplexed via multiplexer 1104 to provide a correlator output on lead 1105.

Figure 12:
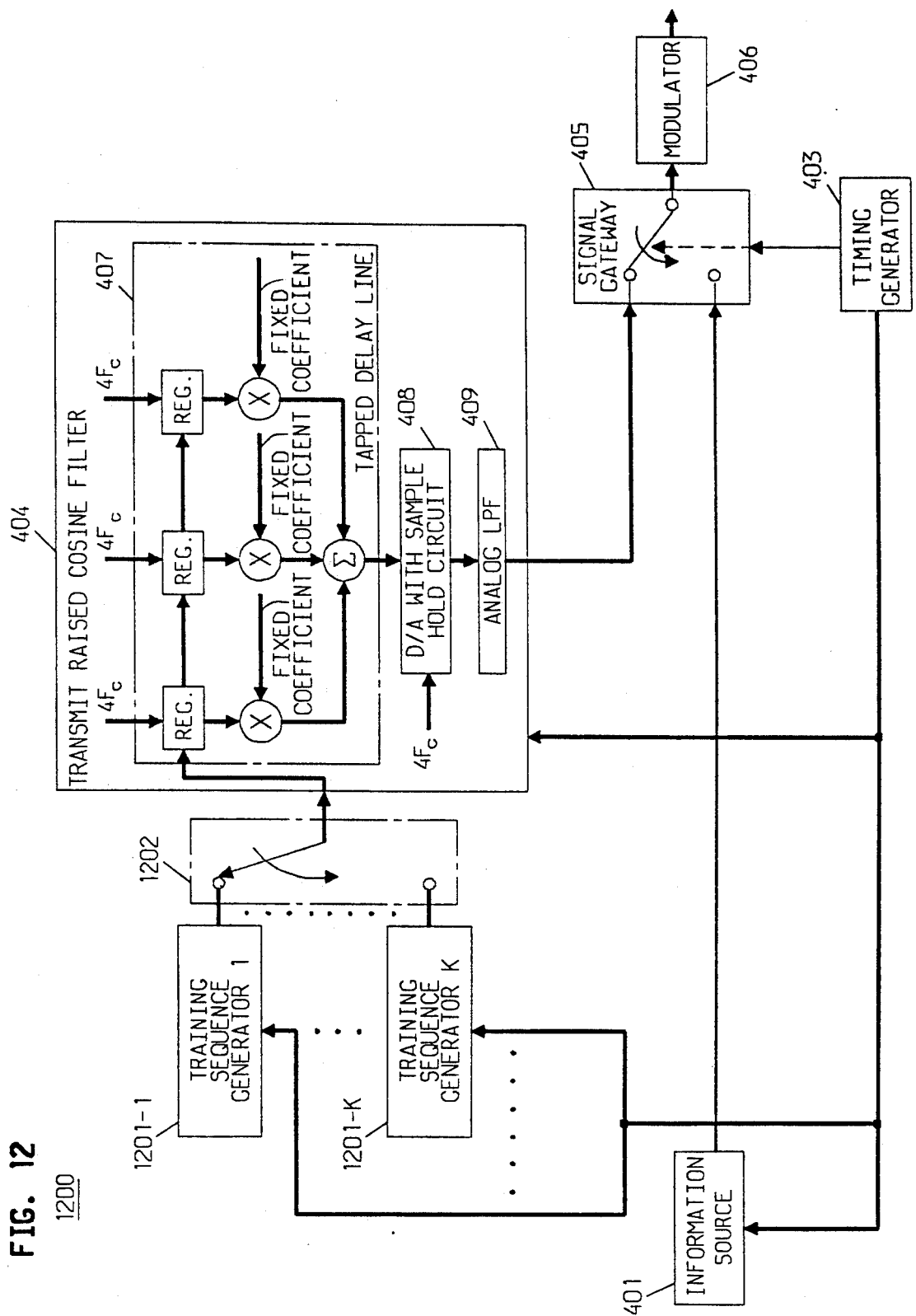
FIG. 12 is a block-schematic diagram representation of an alternate embodiment of a transmitter which incorporates the present invention.

In the foregoing embodiments of the present invention, a training sequence extending for a predetermined time interval, i.e., interval 102 of FIG. 1, was utilized. This time interval is a function of the symbol rate and the number of symbols in the sequence. Of course, either of these two parameters can be varied in different applications so long as time interval 102 is at least as long as the sum of the maximum postcursor and precursor ghost delays. Each of these delays will vary with different system applications and is dependent upon the geographical terrain through which the transmitted signal propagates. FIG. 12 shows an alternate embodiment of a transmitter 1200 which may be used in lieu of the one shown in FIG. 4 to provide any of a plurality of training sequences wherein each such training sequence includes a different number of symbols or a different symbol rate so that each sequence has a different associated time interval 102. For a television application, the symbol rate is generally fixed and the number of symbols in the training sequence provided by any training sequence generator is different from that provided by any other generator. As shown in FIG. 12, to provide any such training sequence, transmitter 1200 includes a plurality of training sequence generators 1201-1 through 1201-K, where K is a predetermined integer, and single-pole, multi-throw switch 1202. Switch 1202, whose switch position is set for a particular system application, permits any of these training sequence generators to be selected and couples the output of the selected generator to transmit raised cosine filter 404. Each of the training sequence generators is clocked by timing generator 403. Filter 404, information source 401, timing generator 403, signal gateway 405 and modulator 406 function in an identical fashion as described in reference to FIG. 4. Advantageously, the time intervals of the training sequences provided by generators 1201-1 through 1201-K should be selected to provide an appropriate range of different training sequence durations to meet the range of expected ghost delay characteristics for a number of different expected system applications.

Figure 13:
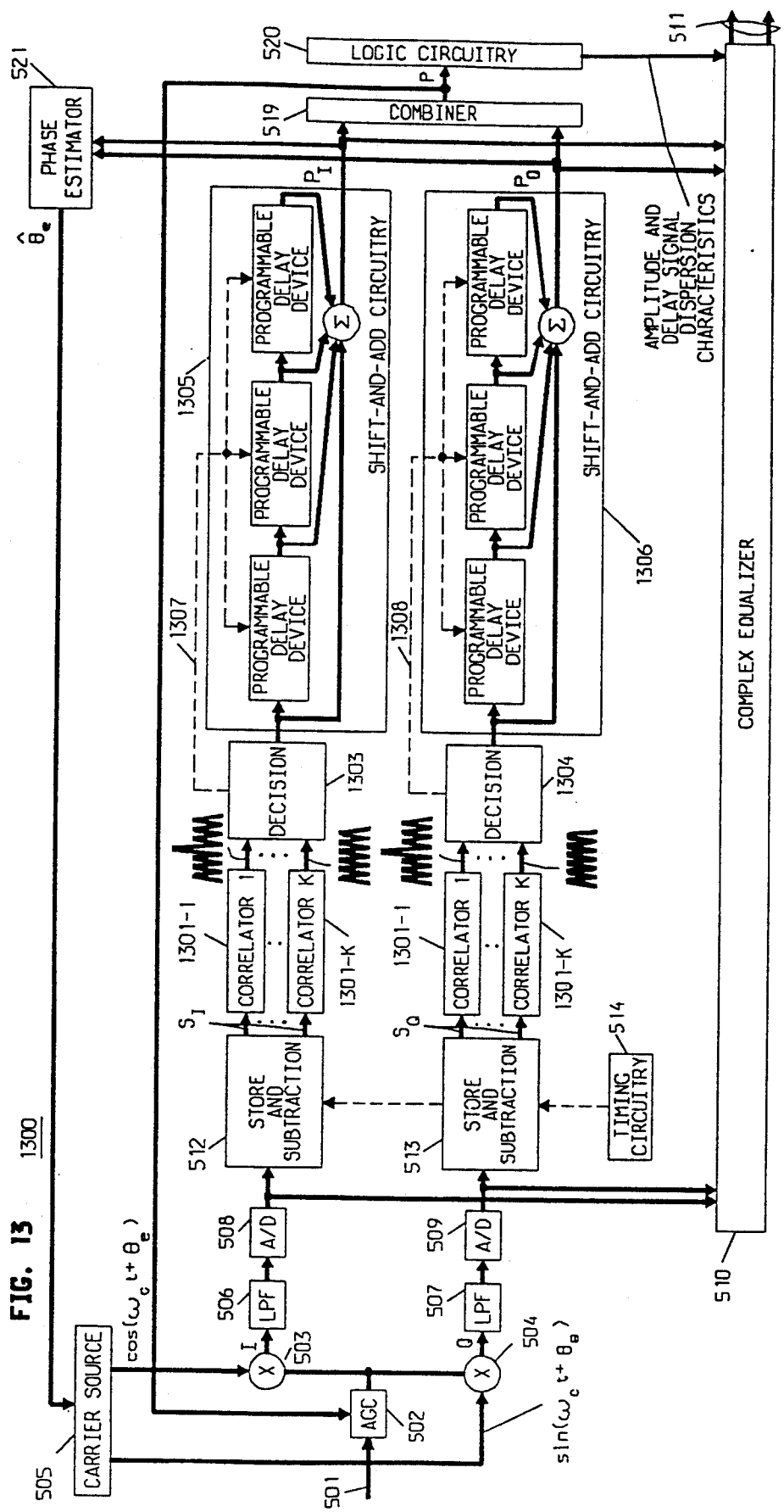
FIGS. 13 and 14 are each a block-schematic diagram representation of an alternate embodiment of a receiver for use with the transmitter of FIG. 11.

FIG. 13 shows an embodiment of a receiver 1300 for use with the transmitter of FIG. 11. Receiver 1300 operates in similar fashion to receiver 500 of FIG. 5 and shares a number of components with receiver 500. Such components in FIG. 13 bear the same reference numerals as their counterparts in FIG. 5. Receiver 1300 also includes a number of components which have been added to provide operation compatible with that provided by transmitter 1100. As shown, receiver 1300 includes a plurality of correlators 1301-1 through 1301-K coupled to the output of store and subtraction circuit 512 in the "I" or inphase channel and a plurality of correlators 1301-1 through 1301-K coupled to the output of store and subtraction circuit 513 in the "Q" or quadrature channel. Each of these correlators is associated with a different one of the training sequences provided by generators 1201-1 through 1201-K in FIG. 12. The function of each correlator is to provide an output pulse upon detecting the associated training sequence. A pair of decision circuits 1303, one connected to the plurality of correlator outputs in the "I" channel and the other connected to the plurality of correlator outputs in the "Q" channel, examines such outputs and determines which of the K training sequences has been transmitted. This determination is then used to control the delay provided within shift-and-add circuitry 1305 and 1306 via a signal on leads 1307 and 1308. In this regard it should be noted that circuitry 1305 and 1306 is identical to shift-and-add circuitry 517 and 518 in FIG. 5 except that programmable delay devices are used in lieu of fixed delay devices. Such fixed delay devices provide a delay of N symbols or the duration of the training sequence. Now, however, since this duration can be any one of K different values, the control signal on leads 1207 and 1208 sets the delay of each programmable delay element to equal the duration of the detected training sequence.

Figure 14:
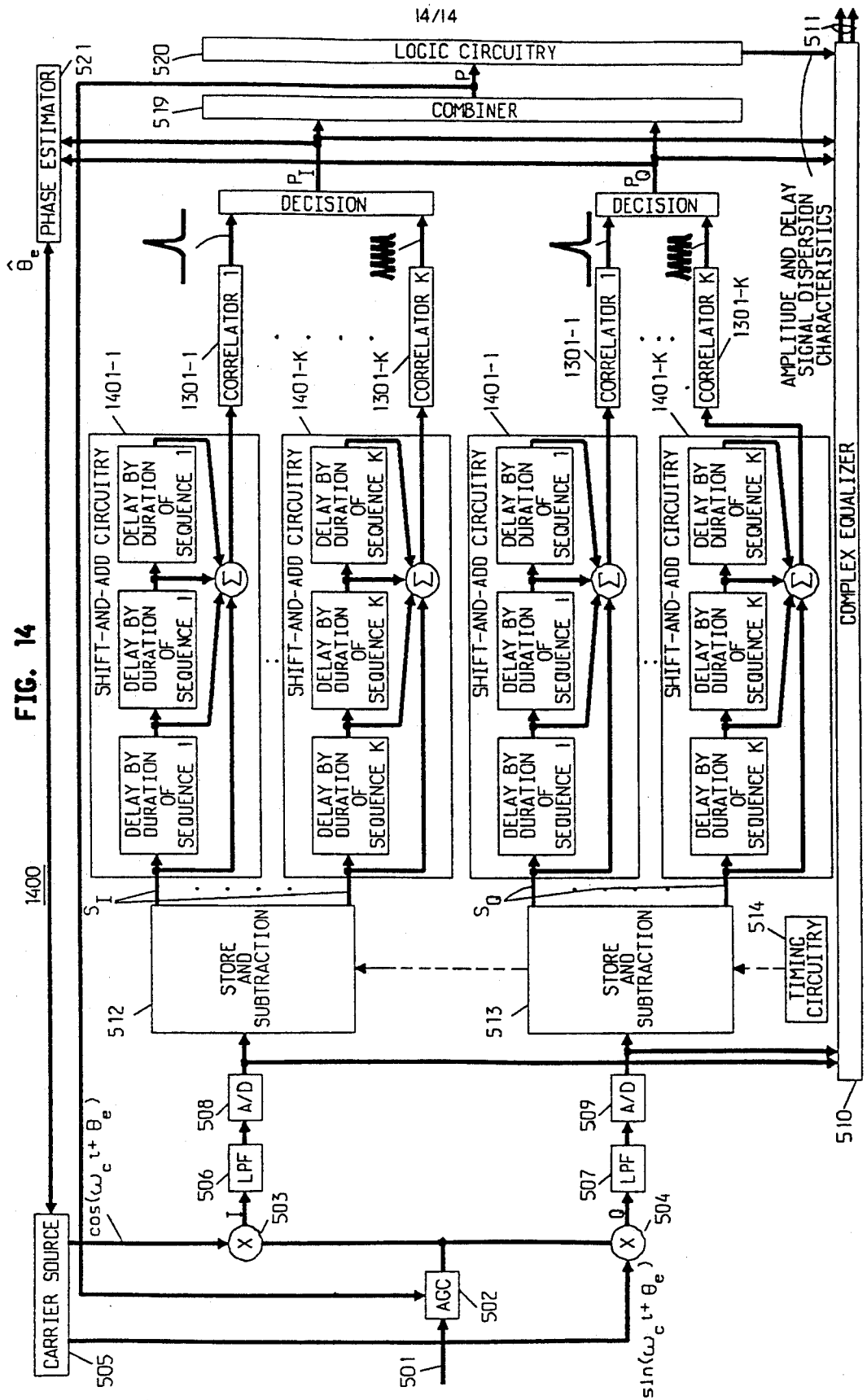

FIG. 14 shows an alternate embodiment of a receiver 1400 with can be used with the transmitter 1100 shown in FIG. 11. Receiver 1400 is analogous to receiver 600 of FIG. 6 and shares a number of components which bear the same reference numerals. To be compatible with transmitter 1100, receiver 1400 includes a plurality of shift-and-add circuits 1401-1 through 1401-K in each of the I and Q channels. Each such circuit incorporates the same number of delay elements and all of the delay elements in any one shift-and-add circuit provide the same delay. In addition, each of the delay elements in different ones of the K shift-and-add circuits 1301-1 through 1301-K provides a delay corresponding to the duration of a different one of the K training sequences provided by transmitter 1100 of FIG. 11. That is, the delay provided by each delay element in shift-and-add circuit 1301-1 is equal to the duration of the training sequence provided by training sequence generator 1101-1, and the delay provided by each delay element in shift-and-add circuit 1301-K is equal to the duration of the training sequence provided by training sequence generator 1101-K. The outputs of the shift-and-add circuits are coupled to correlator 1301-1 through 1301-K in the I channel and correlators 1302-1 through 1302-K in the Q channel and thence to decision circuits 1303 and 1304. The correlators and decision circuits operate in the same manner as described in reference to FIG. 13.

Receivers of the passband variety for use with transmitter 1100 can also be devised. Such passband receivers can be provided by modifying the receivers of FIGS. 8 and 9 in a manner analogous to that provided to the circuitry of FIGS. 5 and 6.

It should, of course, be understood that while the present invention has been disclosed in reference to specific embodiments, numerous other arrangements should be apparent to those of ordinary skill in the art. For example, while the present invention has been disclosed in reference to a VSB or QAM signal, the invention is applicable to any analog or digital communication system regardless of the presence, absence or type of modulation. In addition, the present invention is not limited to pseudorandom or modified pseudorandom training sequences and, indeed, can employ any type of training sequence. Furthermore, the complex equalizer shown in FIGS. 5, 6, 8 and 9 can be positioned so that its outputs are coupled to each correlator input. In such an arrangement, the equalizer serves as a unit impulse fixed filter during system initialization and serves as an adaptive equalizer thereafter.

I claim:

1. Receiver apparatus for use in a communications system wherein any received signal has propagated through a communications medium in which signal dispersion may be present, said receiver apparatus comprising means, responsive to a received training sequence including a plurality of predetermined symbols occurring at a predetermined symbol rate, for processing said received training sequence using correlation and signal replication, and means responsive to the processed training sequence for determining at least one characteristic of said signal dispersion.

2. The apparatus of claim 1 wherein said processing means provides correlation using a clock signal which is n times said predetermined symbol rate, where n is an integer $\geq 1$.

3. The receiver apparatus of claim 1 wherein said training sequence is a pseudorandom sequence and said processing means is responsive to said pseudorandom sequence.

4. The receiver apparatus of claim 1 wherein said processing means correlates said training sequence with a predetermined set of coefficients and replicates said correlated training sequence.

5. The apparatus of claim 4 wherein each coefficient is said predetermined set of coefficients is a binary number.

6. The apparatus of claim 5 wherein the binary numbers have equal positive and negative values.

7. The apparatus of claim 5 wherein the binary numbers have values which are zero and nonzero.

8. The receiver apparatus of claim 1 wherein said processing means replicates said received training sequence at least one time and correlates said received training sequence with a predetermined set of coefficients and correlates the replica of said received training sequence with said predetermined set of coefficients.

9. The receiver apparatus of claim 1 further including a source of at least one carrier signal and said determining means determines the phase characteristic of said signal dispersion and controls said carrier signal source.

10. The receiver apparatus of claim 1 further including an equalizer and said determining means adjusts the operation of said equalizer.

11. The receiver apparatus of claim 1 wherein said determining means determines the amplitude and delay characteristics of said signal dispersion.

12. The receiver apparatus of claim 1 further including an automatic gain control circuit through which said received training sequence is coupled and said determining means includes means for controlling the gain of said automatic gain control circuit.

13. The apparatus of claim 1 wherein said processing means includes correlation means and said correlation means comprises
    means for demultiplexing said received training sequence onto a plurality of input terminals in a cyclic fashion;
    a plurality of sub-correlators each connected to a different one of said input terminals and providing an output; and
    multiplexing means for multiplexing the outputs of said plurality of sub-correlators in said cyclic fashion.

14. A method of determining at least one characteristic of signal dispersion in a communications system wherein said signal dispersion has an expected range of delay, said method comprising the steps of
    generating a training sequence, said training sequence including a number of predetermined symbols and having a duration at least equal to said range of delay,
    transmitting said training sequences in an associated time interval,
    receiving said training sequence and processing the same using correlation and signal replication, and
    determining at least one characteristic of said signal dispersion in response to said processed training sequence.

15. A communications system comprising a transmitter and a receiver which are separated by a communications medium in which signal dispersion having an expected range of delay may be present, said transmitter comprising
    means for generating a training sequence, said training sequence including a number of predetermined symbols and having a duration at least equal to said range of delay, and
    means for transmitting said training sequences in an associated time interval,
    and said receiver comprising
    means, responsive to a received training sequence including a plurality of predetermined symbols, for processing said received training sequence using correlation and signal replication, and
    means responsive to the processed training sequence for determining at least one characteristic of said signal dispersion.

16. Transmitter apparatus for use in a communications system where signal dispersion has a range of delay for each of number of different system applications, said apparatus comprising
    means for selecting any one of a plurality of training sequences, each training sequence including a plurality of symbols and having a duration at least equal to the range of delay associated with an associated system application, and
    means for transmitting only the selected one of said training sequences in an associated time interval at a predetermined symbol rate.

17. The transmitter apparatus of claim 16 wherein said training sequence is a pseudorandom sequence.

18. Apparatus for use in a television signal transmitter wherein the transmitted television signal incorporates a horizontal line period in each of a succession of video frames and wherein signal dispersion having a range of delay is present in the transmitted television signal after propagation through a communications medium, said range of delay varying for different transmitter locations, said apparatus comprising
    means for selecting any one of a plurality of training sequences, each training sequence including a number of predetermined symbols and having a duration at least equal to the range of delay associated with the location of said transmitter, and
    means for transmitting only the selected one of said training sequences in predetermined ones of said horizontal line periods at a predetermined symbol rate.

19. Receiver apparatus for use in a communications system wherein any received signal has propagated through a communications medium in which signal dispersion may be present, said receiver apparatus comprising
    means responsive to any one of a plurality of different received training sequences for processing the received training sequence using correlation and signal replication, each training sequence including a plurality of predetermined symbols occurring at a predetermined symbol rate, and
    means responsive to the processed training sequence for determining at least one characteristic of said signal dispersion.

20. The receiver apparatus of claim 19 wherein each of said plurality of training sequences has a different duration.

21. The apparatus of claim 19 wherein each of said plurality of training sequences is a pseudorandom sequence.

22. The receiver apparatus of claim 19 wherein said processing means includes correlation means and said correlation means comprises
    means for demultiplexing the received training sequence onto a plurality of input terminals in a cyclic fashion;
    a plurality of sub-correlators each connected to a different one of said input terminals and providing an output; and
    multiplexing means for multiplexing the outputs of said plurality of sub-correlators in said cyclic fashion.

23. A communications system comprising a transmitter and a receiver which are separated by a communications medium in which signal dispersion having a range of delay may be present, said range of delay varying with different system locations, said transmitter comprising means for generating a plurality of training sequences, each training sequence including a plurality of symbols and having a duration at least equal to the range of delay associated with an associated system location, and means for transmitting one of said training sequences in an associated time interval at a predetermined symbol rate;

and said receiver comprising means responsive to any one of said plurality of training sequences for processing the transmitted training sequence after propagation through said communications medium using correlation and signal replication, and means responsive to the processed training sequence for determining at least one characteristic of said signal dispersion.

24. Receiver apparatus for use in a communications system wherein any received signal has propagated through a communications medium in which signal dispersion may be present, said receiver apparatus comprising means, responsive to a received training sequence including a plurality of predetermined symbols occurring at a predetermined symbol rate, for generating a plurality of output signals, one of said output signals representing said received training sequence and each of the other output signals representing the receipt of a different training sequence in an ensemble of such sequences which follow said received training sequence, said ensemble, however, is never actually received and said generating means merely mimics the receipt of said ensemble; and means responsive to said plurality of output signals for determining at least one characteristic of said signal dispersion.

* * * * *